US010596965B2

(12) United States Patent
Smith

(10) Patent No.: US 10,596,965 B2
(45) Date of Patent: Mar. 24, 2020

(54) THIRD EYE TRACTOR TRAILER BLIND SIDE DRIVING SYSTEM

(71) Applicant: Lamont Amandro Smith, Marietta, GA (US)

(72) Inventor: Lamont Amandro Smith, Marietta, GA (US)

( * ) Notice: Subject to any disclaimer, the term of this patent is extended or adjusted under 35 U.S.C. 154(b) by 0 days.

(21) Appl. No.: 15/714,973

(22) Filed: Sep. 25, 2017

(65) Prior Publication Data

US 2019/0126823 A1 May 2, 2019

Related U.S. Application Data

(60) Provisional application No. 62/447,870, filed on Jan. 18, 2017.

(51) Int. Cl.
| | |
|---|---|
| *B60R 1/00* | (2006.01) |
| *H04N 7/18* | (2006.01) |
| *B60K 35/00* | (2006.01) |
| *H04N 5/225* | (2006.01) |

(52) U.S. Cl.
CPC ............... *B60R 1/00* (2013.01); *B60K 35/00* (2013.01); *H04N 5/2252* (2013.01); *H04N 5/2257* (2013.01); *H04N 7/181* (2013.01); *H04N 7/183* (2013.01); *B60K 2350/2013* (2013.01); *B60K 2370/176* (2019.05); *B60K 2370/21* (2019.05); *B60R 2300/105* (2013.01); *B60R 2300/802* (2013.01)

(58) Field of Classification Search
CPC ............... B60R 1/00; B60R 2300/105; B60R 2300/802; B60K 35/00; B60K 2350/2013; H04N 5/2252; H04N 7/181
See application file for complete search history.

(56) References Cited

U.S. PATENT DOCUMENTS

| | | | | |
|---|---|---|---|---|
| 7,619,680 | B1 * | 11/2009 | Bingle | B60R 11/04 348/342 |
| 9,227,568 | B1 * | 1/2016 | Hubbell | B60R 1/081 |
| 9,718,405 | B1 * | 8/2017 | Englander | G01S 19/13 |
| 9,908,470 | B1 * | 3/2018 | Englander | G01S 19/13 |
| 2006/0147264 | A1 * | 7/2006 | Doran, Jr. | E01F 9/70 404/73 |
| 2007/0019311 | A1 * | 1/2007 | Stricek | G03B 37/04 359/864 |
| 2008/0136914 | A1 * | 6/2008 | Carlson | G08B 7/06 348/155 |
| 2008/0231980 | A1 * | 9/2008 | Beale | B60R 1/002 359/843 |
| 2012/0185131 | A1 * | 7/2012 | Headley | B60D 1/245 701/41 |

(Continued)

*Primary Examiner* — Reza Aghevli
(74) *Attorney, Agent, or Firm* — Ashley D. Johnson

(57) ABSTRACT

$3^{rd}$ Eye Blind Side Driving System is a camera system that allows its user to see the complete blind side of any vehicle in day or night settings. Specifically targeting Commercial Combination Vehicles. It has the ability to be moved from vehicle to vehicle in various settings, i.e. hauling heavy equipment, tankers, van trailers, mobile homes, shipping containers and just everyday cars, making it universal in its applications. It is designed to help make roadways safer by allowing the driver to see. It can record real time events for investigations and training purposes.

22 Claims, 9 Drawing Sheets

(56) References Cited

U.S. PATENT DOCUMENTS

| | | | | |
|---|---|---|---|---|
| 2013/0107044 A1* | 5/2013 | Azevedo | ............... | H04N 7/18 |
| | | | | 348/148 |
| 2014/0085472 A1* | 3/2014 | Lu | ............... | B60R 1/002 |
| | | | | 348/148 |
| 2016/0059889 A1* | 3/2016 | Herzog | ............... | B62D 13/06 |
| | | | | 701/41 |
| 2016/0243988 A1* | 8/2016 | Peterson | ............... | B60R 1/072 |

* cited by examiner

THIRD EYE TRACTOR TRAILER BLIND SIDE DRIVING SYSTEM

FIELD OF THE INVENTION

The present invention pertains to the field of trucking and vehicular accessories, and more specifically to the field of trailer cameras.

BACKGROUND OF THE INVENTION

The prior art has put forth several designs for trailer cameras. Among these are:

US Patent 2014/0151979 to Aaron Puckett and Robert Laney describes a, system for facilitating coupling between a trailer kingpin and a fifth wheel of a vehicle including at least one rear camera mounted on the vehicle. The rear camera is adapted to provide an image of the kingpin. A monitor in communication with the camera and is adapted to display the image of the kingpin.

US Patent 2014/0085472 to Yuesheng Lu, Steven V. Byrne, Paul A VanOphem and Paul D. Harris describes a vision system for a vehicle that includes a rearward facing camera disposed at a rearward portion of a vehicle. With a rear trailer attached to the vehicle, a processor is operable to process captured images and, responsive at least in part to the processing, to determine a plurality of trailer and vehicle trailer interface parameters. The system is operable to calculate a calculated trailer angle based at least in part on calculations involving the parameters and a steering angle of the vehicle. Responsive to processing of images captured by the camera, the system is operable to determine a determined trailer angle of the trailer relative to a longitudinal axis of the vehicle. Responsive to the determined trailer angle and the calculated trailer angle, the system is operable to determine a degree of offset between the calculated trailer angle and the detected trailer angle.

US Patent 2014/0022389 to Scott Kageta describes an apparatus including a video control circuit that is configured to receive a first video signal from a first camera and a second video signal from a second camera. The video control circuit is configured to provide the first video signal or the second video signal in response to a control signal. The control signal is indicative of whether a trailer plug is connected to a vehicle plug. Another embodiment relates to a method of using a trailer camera with a vehicle including a reverse camera and a display. The method includes receiving at least one of a first video signals from the reverse camera already on the vehicle and a second video signal from the trailer camera. Yet another embodiment relates to a video circuit for a vehicle being capable of use with a trailer. The vehicle includes a backup camera and the trailer includes a trailer camera. The video circuit includes a first input for receiving a first video signal from the backup camera, a second input for receiving a second video signal from the trailer camera, and a control input for receiving a video signal enable signal on a video signal enable conductor. The video circuit further includes a control circuit for providing the second video signal to the display in response at least in part to the video signal enable signal.

US Patent 2013/0076007 to Joseph Goode and Kirk Andrew Parrish describes a vehicular backup camera for viewing a middle chassis, mounted trailer hitching structure. A pickup truck comprises a chassis, a rear axle attached to the chassis, a passenger cabin, a cargo bed, a trailer hitching structure and a first image capturing device. The passenger cabin is attached to the chassis forward of the rear axle. The cargo bed is attached to the chassis over the rear axle. The trailer hitching structure is attached to the chassis at a position rearward of the vehicle occupant structure and has a trailer engaging portion accessible within the cargo bed. The first image capturing device is attached to the passenger cabin. The first image capturing device is mounted in a manner allowing the first image capturing device to capture an image of the trailer engaging portion of the trailer hitching structure.

US Patent 2013/0038731 to Thomas A. Bray and Don Petersen describes a movable backup camera that is placed at the rear of a vehicle or at the rear of a towed trailer to capture images that are outside the driver's field of view. Captured images are modulated onto a radio frequency signal, which is broadcast and picked up by a mating radio frequency receiver, typically located inside the towing vehicle. Captured picture information on the radio frequency signal is recovered and used to generate an image on a display device that is seen by the driver. An attaching device is provided to the camera to allow the camera to be attached to the vehicle or a trailer and its location is changed as needed. The camera thus provides a method and apparatus for wirelessly conveying to the driver those images in an otherwise obstructed field of view.

None of these prior art references describe the present invention.

SUMMARY OF THE INVENTION

It is an object of the present invention to provide camera and video recording capability for a commercial or domestic driver to view a radius from approximately fifty to one hundred seventy degrees on the right side of their trailer rig.

BRIEF DESCRIPTION OF DRAWINGS

(FIG. 8 Continued)

DETAILED DESCRIPTION OF THE INVENTION

Figure 1:
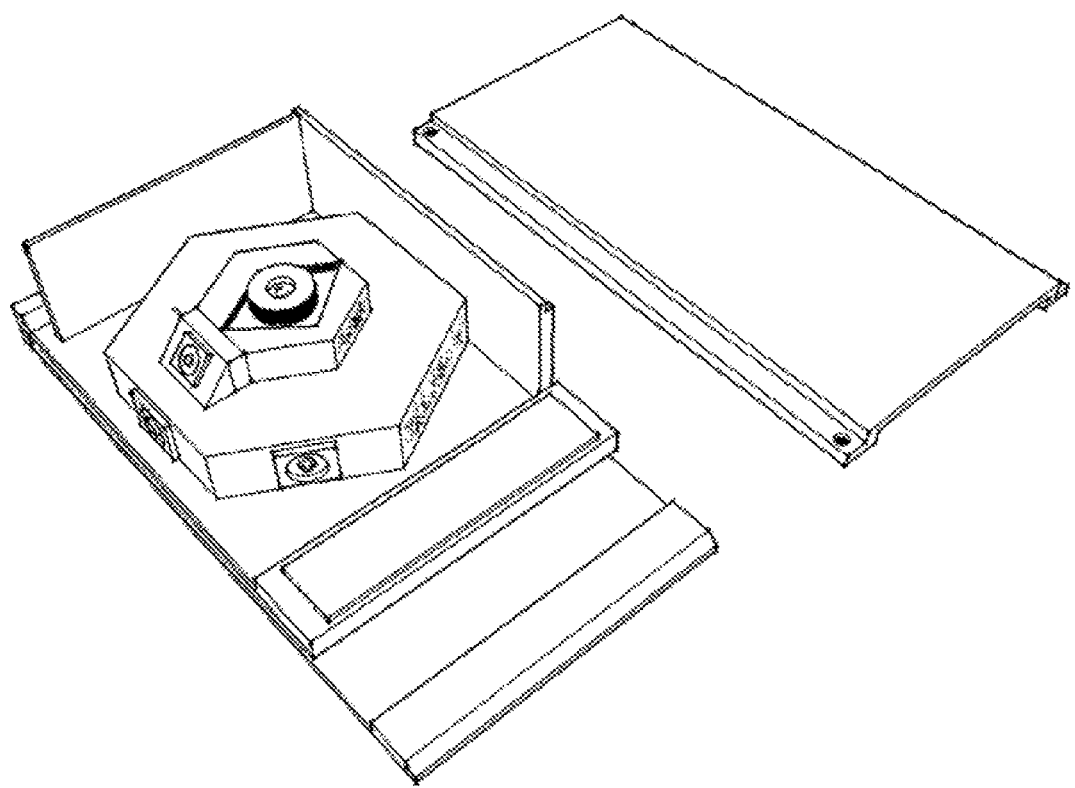
FIG. 1 is a perspective top down diagonal view of the present invention's camera component showing an outward camera, an angle camera, a side camera, a downward angle camera, a weather shield, a mounting clip and a mounting bracket.
Figure 2:
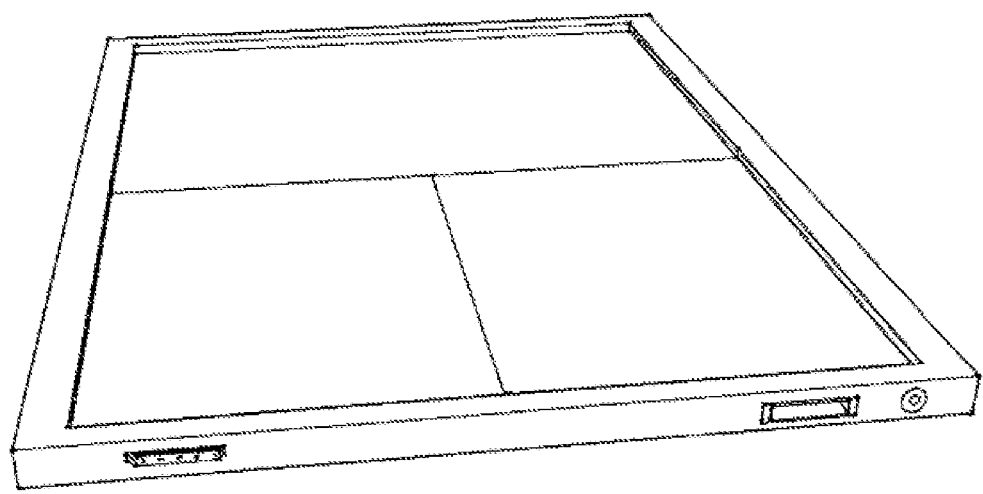
FIG. 2 is an illustrative top down diagonal front view of a seven-inch viewing tablet containing three display screens, a power port, a headphone jack, and a micro SD card slot.
Figure 3:
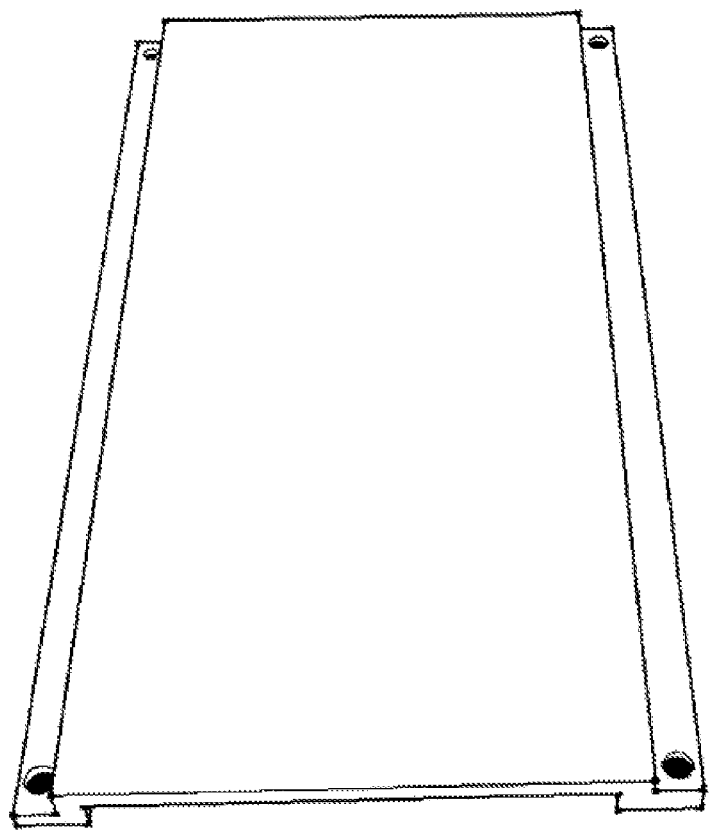
FIG. 3 is a prototypical illustrative view of a first embodiment of a mounting bracket that is fixedly attachable to a basic trailer by means of approximately four bolts.
Figure 4:
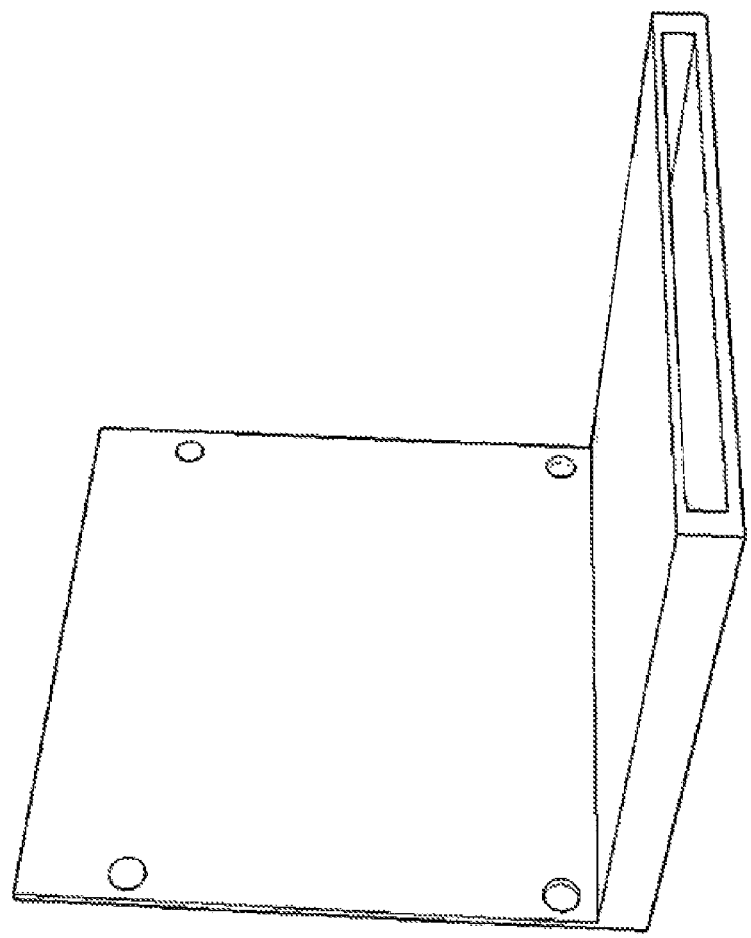
FIG. 4 is a prototypical side elevational view of a second embodiment of a mounting bracket that is fixedly attachable by means of approximately four bolts or screws to a tanker's fender or to a van style trailer with a canvas cover.
Figure 5:
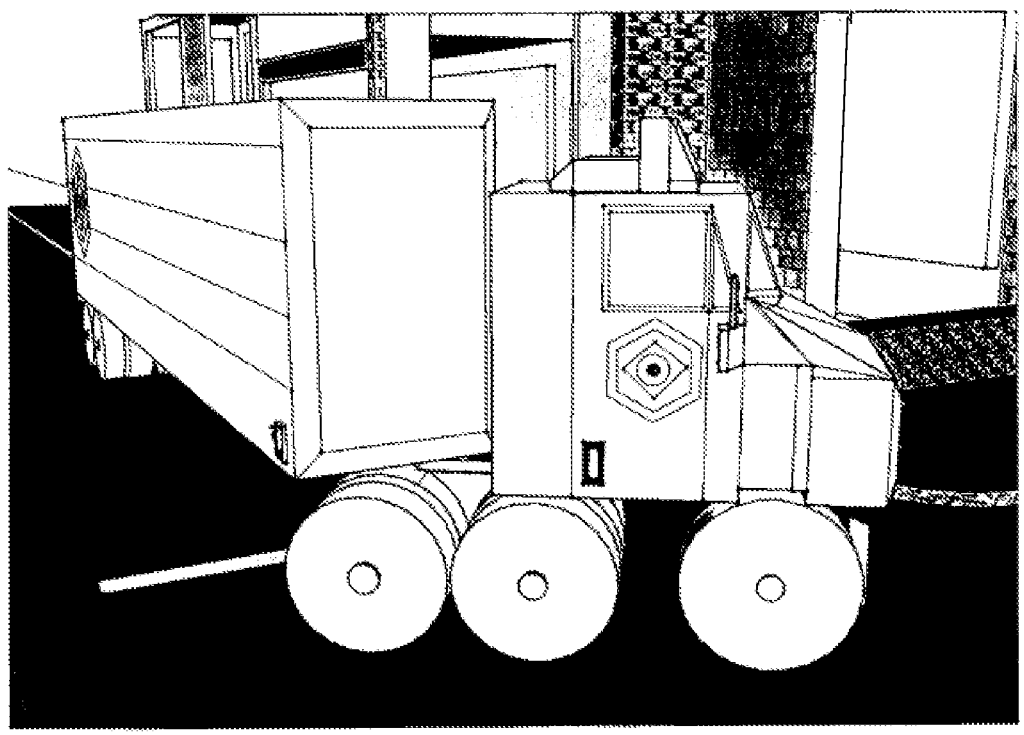
FIG. 5 is a prototypical functional closeup view of a trailer showing the camera component mounted within the first embodiment of the mounting bracket fixedly attached to front lower corner on the right side of a basic trailer.
Figure 6:
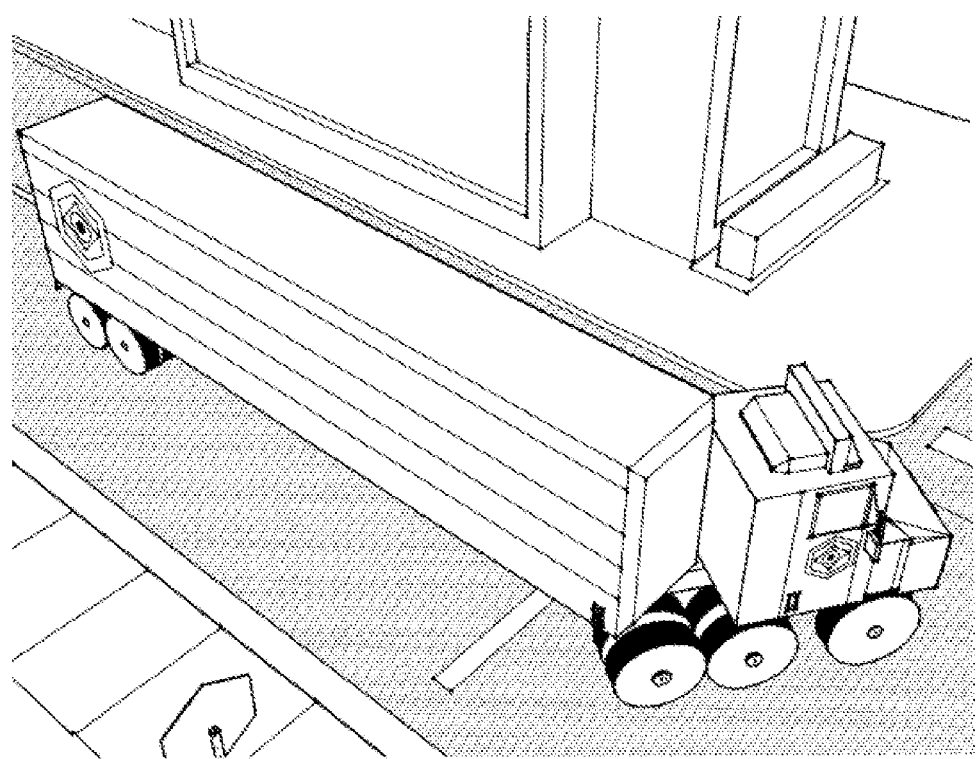
FIG. 6 is a prototypical functional view of a tractor trailer turning to the left and showing the full seeing range of the multiple camera lenses mounted in the first embodiment of the mounting bracket fixedly attached to front lower corner on the right side of a basic trailer.
Figure 7:
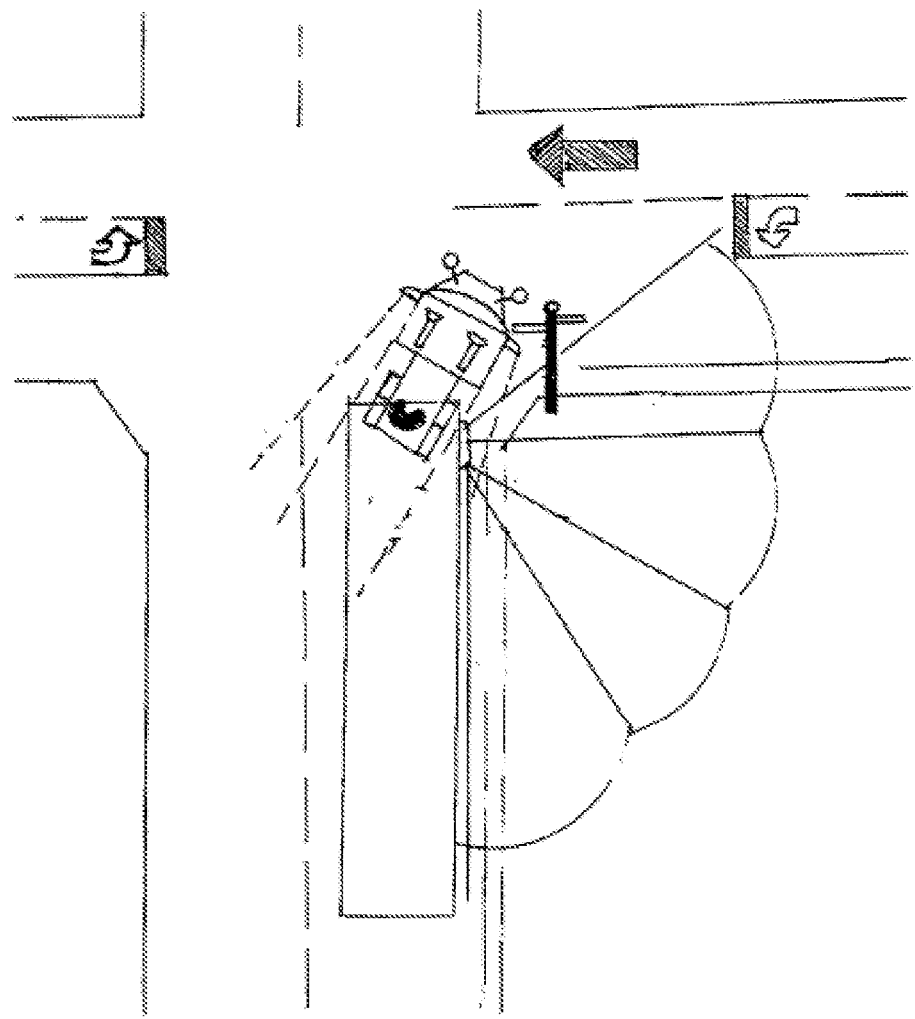
FIG. 7 Is a functional top down view showing a tractor turning right and a visual Radius projected from each camera lens located in the camera component Mounted on the front right side of the trailer.
Figure 8:
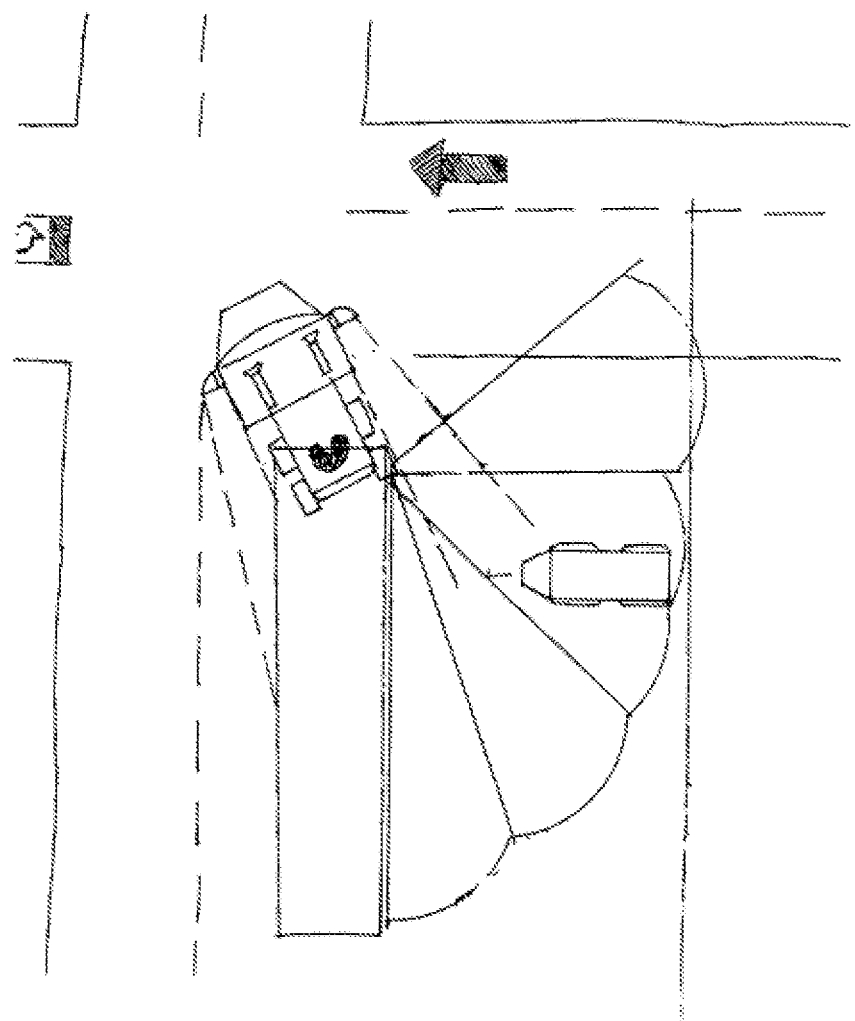
FIG. 8 is a functional top down view showing a tractor turning left and a visual Radius projected from each camera lens located in the camera component mounted on the front right side of the trailer.
Figure 9:
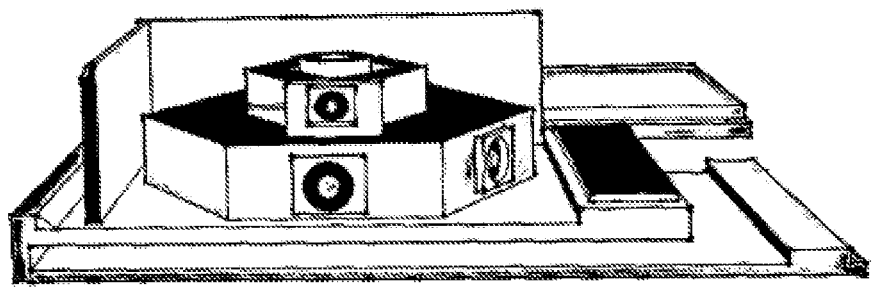
FIG. 9 Is a prototypical Side view of the present Invention's Camera Component showing a outward Camera, an Angle Camera, a side camera, a downward angle camera, a weather shield, a mounting clip and a mounting bracket.

Millions of professional truckers head off across the highways and byways of this great land every day, transporting goods and products to the American consumer populace. Whether a local produce man delivering fresh milk and eggs to the neighborhood grocer, a commercial mover transporting a family's belongings across the state or a long haul driver delivering medical supplies to hospitals across the country, the trucking industry and professional truck drivers are crucial members of society, delivering food, goods and supplies needed by people from all walks of life. Unfortunately for truckers, there is one problem which can impede their ability to deliver goods safely.

A driver's visibility of the area to the right side of their tractor trailer is extremely limited as the only reflection they can view is through their side mirror or mirrors located on the right side of the cab. When turning, changing lanes and backing up drivers often miss seeing motorists and cyclists driving and riding next to or behind their rig. In parking areas and alley ways, it is often impossible to see curbs, mailboxes, light posts, trash cans and even people. This lack of good visibility during the day and at night causes accidents that result in property damage, serious injuries and fatalities. These accidents lead to expensive lawsuits and insurance claims.

The present invention, hereinafter referred to as the Third Eye Tractor Trailer Blind Side Driving System or the Third Eye Driving System, is a monitoring, video recording and camera system that is installed in tractor trailer rigs or vehicles hauling trailers or boats. The primary function of the present invention is to help trailer drivers be safer on the roadways by providing the driver with a visible means of seeing everything located on and underneath the right side of the truck cab and trailer. Engineered primarily for a professional driver's combo commercial vehicle, the present invention also functions extremely well for nonprofessionals driving domestic trucks or vehicles that are towing flatbed trailers, livestock trailers, horse trailers, boats, recreational campers and mobile homes.

The Third Eye Tractor Trailer Blind Side Driving System comprises three main components that work in conjunction with each other. The first component is a video monitoring component. The second component is an external mounting bracket. The third component is a detachable camera housing containing cameras.

The video monitoring component comprises a display monitor screen which is placed in the front of the cab or towing vehicle. Similar in size to a personal computer tablet or notebook, the monitor screen measures approximately seven inches in height by seven inches in width. The monitor screen is securable to the front windshield by an attachable suction mechanism. The monitor screen displays approximately four camera images simultaneously, or a user can press each camera image into a full screen mode and view one image only. The video monitoring component records camera video for up to approximately forty eight hours. Stored on a removable drive, this camera video functions as an aid in showing safe driver practices, processing accident claims and conducting lawsuits.

The external mounting bracket that is durably constructed of a weather resistant material such as fiberglass. The mounting bracket is attached to the towed trailer, boat or home by means of bolts and screws, a super adhesive or a hook and loop material. The function of the mounting bracket is to securely hold the camera housing and cameras while in transit. Additional mounting brackets are available for companies and individuals who have multiple trailers. A user installs one mounting bracket permanently on each trailer. The user then can move the camera component to the trailer being used at the moment.

The detachable camera component is comprised of a durable and weather resistant housing that is octagonal in shape and holds up to approximately twelve cameras. The camera component resides in the external mounting bracket while in transit. This camera component captures real time images while the tractor trailer is in motion, whether moving forward, moving in reverse, or turning left or right to another street.

The aforementioned cameras are strategically distributed in the front and sides of the octagonal housing to provide the driver with multiple radial views of the area to the right of the trailer rig which is commonly called the Blind Side. Combined together, the images from all the cameras provide a driver with radial views from approximately fifty to one hundred seventy degrees to the right side of his rig and trailer. The cameras have day vision and night vision capabilities. The appropriate vision is employable depending on whether one is driving during daylight or nighttime hours.

The monitoring and camera components are connectable to each other through a wired connection within the truck and trailer or they can be set up as a wireless connection. When the camera component is detached and separated from the monitor screen, the Third Eye Driving System emits an audible tone to alert the driver that the camera no longer is communicating with the monitor in the truck cab. This functionality prevents a driver from driving away without the camera component when hauling and dropping a trailer at a designated location. The Third Eye Driving System has programmable parameters in its monitor's setup menu that define an amount of disconnected time or distance in which to begin emitting the aforementioned audible alert.

The present invention's electrical components rely on stored electrical charge and are charged using the tractor's power inverter. For vehicles without power inverters, the components are pluggable into a standard wall outlet for charging. A driver can remove the electrical components and charge them as needed during rest breaks. The present invention is manufactured as an aftermarket accessory or it is integrated into a tractor truck or towing vehicle at the point of manufacture.

Using the Third Eye Tractor Trailer Blind Side Driving System is simple and straightforward. If the present invention was incorporated into the tractor at point of vehicular manufacture, user installation is eliminated. If the present installation is purchased as an aftermarket accessory, user installation is required. After purchasing the Third Eye Driving System, the trucker or layman opens the packaged components which include a monitoring screen, a mounting bracket, a camera device and all necessary installation parts including electrical cords, cables, screws, fasteners and suction cups. The user installs the mounting bracket in an optimal viewing location on the outside of the trailer being towed, generally the bottom right corner in closest proximity to the back right or passenger side of the hauling truck or vehicular cab. After electrically charging and setting operational parameters for the monitor screen and camera components, the user then places these components in their respective locations. The monitor screen attaches to the front windshield of the towing vehicle. The camera component attaches to the external mounting bracket.

The user then drives as usual, automatically engaging the use of the motion activated cameras when moving forward, changing lanes, turning left or right, and backing up. The monitor screen displays approximately four radial views or images at one time. If a user wants a close up view of one of the images, he or she simply selects a full screen mode on one of the images to display up that one image on the whole screen.

Attachable to hitchable hauler devices such as trailers, low boys, flat beds and tankers, the Third Eye Driving System is a camera monitoring and recording system that aids all drivers in seeing an extremely wide radial view of everything in the blind spot located alongside and underneath the right side of the truck and trailer. The passenger's side mirror provides a very limited and narrow view of the right side while the present invention widely expands the viewing capability. A hauler using the present invention can clearly see motorists, motorcyclists, bicyclists, pedestrians, lamp posts, street curbs, pot holes and all the other gotchas on the road. This improved visual capability will greatly reduce accidents and fatalities occurring every day and night on major highways and local roadways.

Although this invention has been described with respect to specific embodiments, it is not intended to be limited thereto and various modifications which will become apparent to the person of ordinary skill in the art are intended to fall within the spirit and scope of the invention as described herein taken in conjunction with the accompanying drawings and the appended claim.

What is claimed is:

1. A blind side vision system for improved driver visibility, the blind side vision system comprising:
    an external mounting bracket for attachment on a blind side of a primary vehicle, the blind side being opposite the driver of the primary vehicle;
    a video camera housing that can be removably attached and detached to and from the external mounting bracket, wherein the video camera housing comprises a plurality of internal locations, each internal location providing for securing a video camera therein;
    at least one video camera securable to one particular internal location of the plurality of internal locations, so that the at least one video camera is located within the attachable video camera housing, the at least one video camera capturing real-time images during vehicle use;
    a video monitoring component located within reach of the driver, for receiving video from the at least one video camera, providing video output, and providing control functionality for the driver to select and adjust viewing images from the at least one video camera,
    wherein the video monitoring component provides adjustable visibility to the driver, the adjustable visibility including a range of viewing angles from the blind side of the primary vehicle.

2. The blind side system of claim 1, wherein the video monitoring component receives video from the at least one video camera via a wireless connection.

3. The blind side vision system of claim 1, the at least one video camera further comprising a plurality a video cameras, wherein each video camera is located at a separate internal location from the plurality of internal locations, so that each video camera provides a viewing angle distinct from each other video camera, the plurality of video cameras together providing viewing range beyond the range of side mirrors and wide-angle mirrors.

4. The blind side vision system of claim 3, further comprising at least one video camera of the plurality of video cameras that includes night vision capability.

5. The blind side vision system of claim 1, wherein the video monitoring component further comprises removable storage for received video.

6. The blind side vision system of claim 1, wherein the video monitoring component includes a mobile computing device, an application for use on the mobile computing device, or both.

7. The blind side vision system of claim 6, wherein the mobile computing device is a tablet computer, laptop computer, or smart phone.

8. The blind side vision system of claim 1, further comprising the external mounting bracket attached to a second blind side of a second vehicle separate from and attached to the primary vehicle, the second blind side also being opposite the driver.

9. A blind side vision system for improved driver visibility, the blind side vision system comprising:
    an external mounting bracket for attachment on a blind side of a trailer attached to a primary vehicle, the blind side being opposite the driver of the primary vehicle;
    a video camera housing that can be removably attached and detached to and from the external mounting bracket, wherein the video camera housing comprises a plurality of internal locations, each internal location providing for securing a video camera therein;
    at least one video camera securable to one particular internal location of the plurality of internal locations, so that the at least one video camera is located within the attachable video camera housing, the at least one video camera capturing real-time images during primary vehicle use;
    a video monitoring component located within reach of the driver, for receiving video from the at least one video camera, providing video output, and providing control functionality for the driver to select and adjust viewing images from the at least one video camera,
    wherein the video monitoring component provides adjustable visibility to the driver, the adjustable visibility including a range of viewing angles from the blind side of the primary vehicle.

10. The blind side vision system of claim 9, wherein the video monitoring component receives video from the at least one video camera via a wireless connection.

11. The blind side vision system of claim 9, the at least one video camera further comprising a plurality a video cameras, wherein each video camera is located at a separate internal location from the plurality of video locations, so that each video camera provides a viewing angle distinct from each other video camera, the plurality of video cameras together providing viewing range beyond the range of side mirrors and wide-angle mirrors.

12. The blind side vision system of claim 11, further comprising at least one video camera of the plurality of video cameras that includes night vision capability.

13. The blind side vision system of claim 9, wherein the video monitoring component further comprises removable storage for received video.

14. The blind side vision system of claim 9, wherein the video monitoring component includes a mobile computing device selected from a tablet computer, a laptop computer, a smart phone, an application for use on a mobile computing device, or combinations thereof.

15. The blind side system of claim 1, further comprising a weather shield positioned on at least one side of the video camera housing to protect the at least one video camera.

16. The blind side system of claim 9, further comprising a weather shield positioned on at least one side of the video camera housing to protect the at least one video camera.

17. The blind side system of claim 1, further comprising a recording element to record real time events.

18. The blind side system of claim 9, further comprising a recording element to record real time events.

19. The blind side system of claim 1, wherein the video camera housing comprises a magnet mount.

20. The blind side system of claim 9, wherein the video camera housing comprises a magnet mount.

21. The blind side system of claim 1, further comprising a safety feature comprising an audible tone when the at least one video camera is not communicating with the video monitoring component.

22. The blind side system of claim 9, further comprising a safety feature comprising an audible tone when the at least one video camera is not communicating with the video monitoring component.

* * * * *